May 13, 1958 H. ROMBERG 2,834,493
PORTABLE STORAGE BIN
Filed April 2, 1956
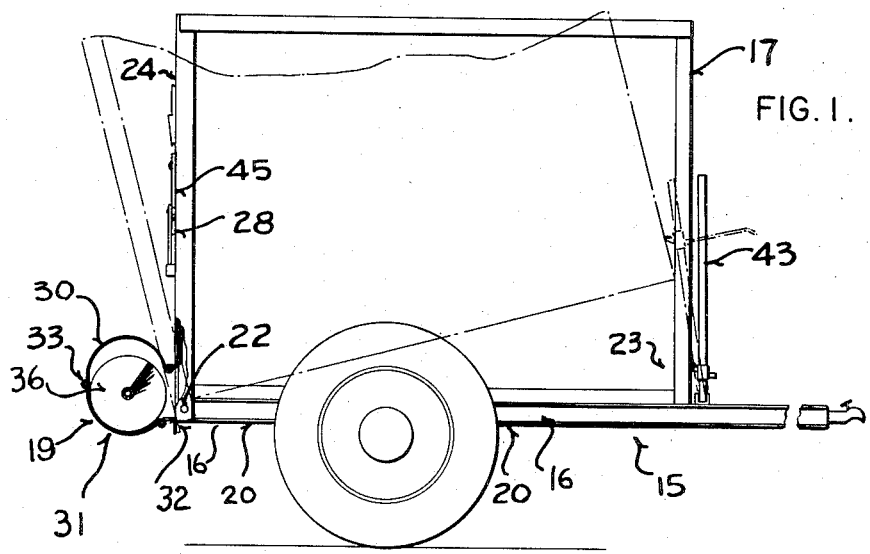
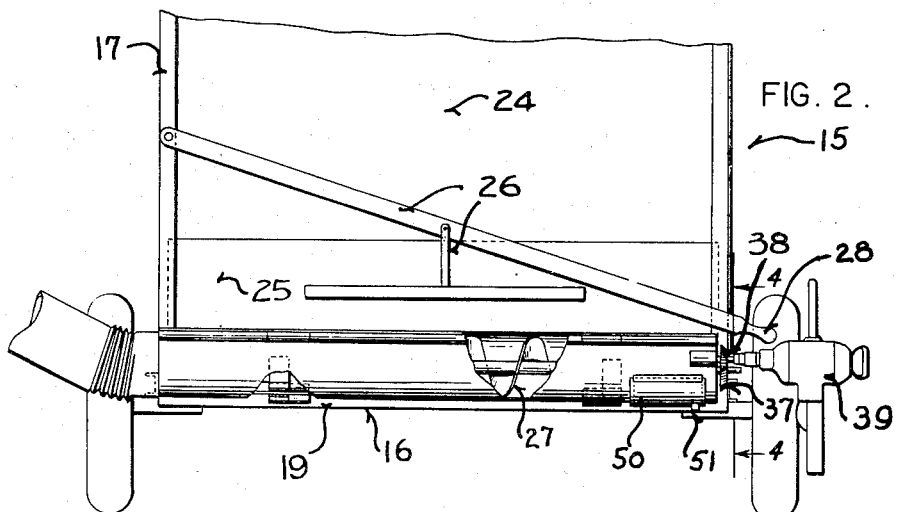
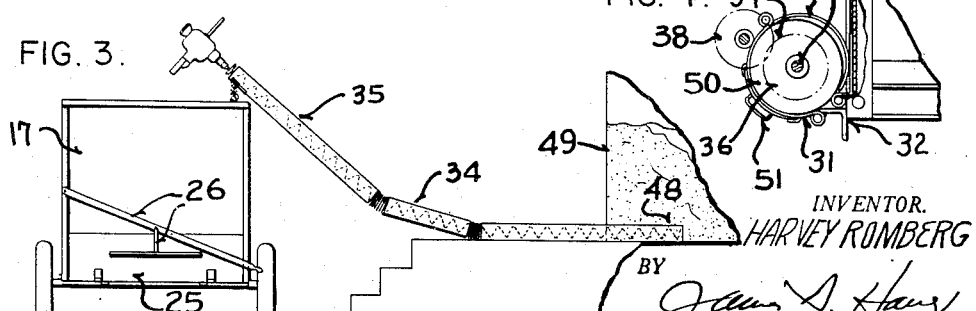
INVENTOR.
HARVEY ROMBERG
BY
ATTORNEY

United States Patent Office 2,834,493
Patented May 13, 1958

2,834,493

PORTABLE STORAGE BIN

Harvey Romberg, Oshkosh, Wis.

Application April 2, 1956, Serial No. 575,549

6 Claims. (Cl. 214—509)

This invention relates to improvements in an article of manufacture for transporting and loading or otherwise unloading bulk goods of the type easily transported and handled by automatic machinery.

At present the farmer or feed man sometimes provides a large open or closed type trailer bin for transporting amounts of wheat, oats, barley and the like. It becomes quite necessary to provide some type of effective storage device for bringing the bulk goods from the farm to the grainery or brokerage house. Various manufacturers provide a metal storage type trailer conveyor for this requirement; however, they do not provide for the loading or unloading of the storage trailer. Normally the farmer must rely upon whatever contrivance he might have at the farm for such loading of the trailer. In some cases the farmer sacks the grain or seed and then hauls the sacks to the buyer.

Naturally, when manual loading of several hundred pounds of grain or the like is necessary, the worker hardly relishes the idea of doing it too often and it gets to be an unpleasant chore for the farmer. With this in mind the present invention has been purposely designed to facilitate and considerably ease the task of loading, transporting, and unloading bulk goods of the type which the farmer must haul.

It is therefore a principal object of this invention to provide an improved portable storage bin for loading, transporting and unloading bulk goods such as grain and the like.

Another object of this invention is to provide an improved portable bin device for the farmer to use in unloading upon delivery of the grain to the buyer.

Still another object of the invention is to provide an improved article of manufacture for use in loading grain or like substances into a storage bin and subsequently automatically unloading the contents of the bin.

A more specific object of this invention is to provide an article of manufacture for automatically feeding the contents of a storage bin into another storage area without requiring manual efforts.

A yet further object of this invention is to provide a storage bin mounted on a mobile frame unit and having a removable auger type feeding mechanism.

With the above and other objects in view, the inventions consists of the improved portable storage bin, and all of its parts and variations, as set forth in the claims, and all equivalents thereof.

In the drawings accompanying and forming a part of this specification, wherein is shown one complete embodiment of the preferred form of article of manufacture for improvements in portable storage bin devices and wherein like characters of reference indicate the same parts in all of the views:

Fig. 1 is a side elevational view of the assembled bin device, the pivotal bin portion being shown in dotted lines to indicate the direction in which it can be tilted.

Fig. 2 is an end elevational view of the device showing in detail the feed auger construction and location on the bin.

Fig. 3 is a diagrammatic view of the device using the auger mechanism for loading the bin.

Fig. 4 is a sectional view taken along lines 4—4 of Fig. 2.

Referring more particularly to the drawing the numeral 15 indicates the mobile bin device in its assembled condition. This bin device 15 is primarily composed of a frame member 16 having a pair of wheels 14 for making the device mobile, a metal or wood frame type bin 17 mounted upon the frame 16, and a mechanical device mechanism 19 for automatically removing or otherwise transporting material from the bin 17 or as described further in this application.

The frame member 16 may be a standard type trailer frame having longitudinal steel members 20 and any number of suitable cross-frame members sufficient to support a loading as required by the particular use of the device. Naturally, the frame and bin must be constructed to provide for the type of material that is to be hauled.

In the present case the description of the invention will be directed more specifically to the use of such materials as oats, barley or the like which must be transported by the farmer from his storage facilities to the feed dealers. The modification illustrated in the drawing provides for the bin 17 to have its lower rear edge mounted for hinged motion as shown at 22. The front end 23 of the trailer bin is free to be raised from the frame member 16 to facilitate feeding all of the contents of the bin 17 into the mechanism 19.

The rear wall portion 24 of the bin 17 has provided therein a suitable type closure 25. By lifting the handle 28 the plate 25 is raised vertically by means of the linkage 26. Raising of this plate 25 provides an opening into the storage bin 17. In the present construction there is provided a tubular type mechanical device 19 mounted in parallel relation with the opening provided when raising the plate 25. This mechanism 19 comprises a split tubular steel closure for the auger 27 which is the construction used for transporting material through the tubular device.

As illustrated in Fig. 2 the split portion of the tubular mechanism provides for a section 30 to be hingedly mounted with the movable plate 25 and the other section 31 to be hingedly mounted to the firm portion 32 of the bin 17. And as previously explained the two sections 30 and 31 are hingedly connected to each other as shown in Fig. 1 at 33.

The auger mechanism 27 is mounted within the split tubular portion and also continues through the entire length of the tubular portions 34 and 35. A plate portion 36 welded to the section 31 serves as the mounting board for the gears 37 and 38 to which can be connected the electric power drill 39 as shown in Fig. 2. The use of two or more gears such as 37 and 38 is suggested since the speed of the normal power drill is far too great to permit efficient operation of the device and reduction gears must be provided.

It is pointed out that the entire mechanism 19 can be removed from the bin 17 and the storage bin opening closed and the device would then be in condition for transporting the contents of the bin.

The auger mechanism 27 aside from having its one end 40 mounted for rotation in plate 26 fits snugly within the split tubular portion and otherwise operates much the same as any normal auger type device.

The operation of the device is as follows:

Upon filling the bin 17 with material such as oats it becomes necessary to transport the oats to the market or purchaser and thereupon remove the same. The operator thereupon connects the tubular mechanism 19 by means of the hinge mechanism 42 to the plate 25 and bin portion 32. The plate 25 is raised by the handle thereby opening the inside of the bin 17 to the auger device 27. The type of material being emptied will determine the amount of the opening that should be used since a wet material cannot be moved by the auger device as fast and as efficiently as dry material. The power of the drill 39 likewise will determine the amount of material which can be fed to the auger 27.

To further facilitate emptying the bin 17 the hinge connection 22 and the jack mechanism 43 permits tilting the bin 17 to the angle necessary to completely empty it. The use of this jack mechanism 43 is suggested in many uses since the operator does not normally want to disconnect the trailer from the car or truck just to unload the bin 17. However, should a trailer such as illustrated in Fig. 1 be used it is apparent that if the trailer is disconnected it could be easily tilted to facilitate emptying while the auger mechanism is in operation.

A further point to facilitate the use of the device is the use of a ratchet construction 45 with the handle 28 device to permit opening the plate 25 and setting or locking it in the desired position. Any suitable means could be used other than the ratchet mechanism for this purpose.

Fig. 3 illustrates the use of the device in another way; namely in filling the bin with the same auger mechanism 27 which is used to empty the bin 17. By feeding the material to the open end 48 of the auger mechanism 27 and reversing the rotation of the auger the material is fed from the permanent storage bin 49 through the auger device 27 into the storage bin 17. A sliding door construction 50 which has a handle 51 thereon to facilitate opening the same is provided for this specific purpose. Naturally when the auger mechanism 27 is used in the way shown in Fig. 2 the sliding door 50 is closed to prevent leakage of any of the material.

The specific illustrations and corresponding description are used for the purpose of disclosure only, and various changes may be made therein without departing from the spirit of the invention. All of such changes are contemplated as may come within the scope of the claims.

Having thus described the invention, what I regard as new and desire to secure by Letters Patent is:

1. A portable bin device comprising: a mobile frame unit, a storage compartment, means mounting said storage compartment on the frame for pivotal movement therewith, means adjacent one end of the storage compartment for unloading the same comprising an auger having a split casing portion and being mounted on the storage compartment by hingedly connecting one portion of the casing to a stationary portion of the storage compartment, a movable door in said storage compartment, and the other split casing portion being hingedly mounted on said movable door whereby opening of said door separates a portion of the casing and exposes the auger to the interior of the storage compartment, and completely closes the communication between the storage compartment and the auger upon movement of the split casing portions to a closed position, said split casing portion being adapted to provide an opening from the storage bin to said auger from a closed position to an opening which provides an exposure of one half of the circumference of the said auger.

2. A portable bin device comprising: a mobile frame unit, a storage compartment having a movable door, means mounting said storage compartment on the frame, means adjacent one end of the storage compartment for unloading the same comprising an auger mechanism having a tubular casing and having an opening in the casing whereby opening of the movable door exposes the auger to the interior of the storage compartment, said tubular casing being a split hinged construction and having one split casing portion thereof hingedly connected to a stationary portion of the storage compartment and the other split casing portion being hingedly mounted on said movable door, said split tubular casing providing a substantially dust free construction to prevent loss of materials during operation, and being adapted to expose the interior of said storage compartment to a varying amount of from one half or less of the circumference of said auger mechanism.

3. A mobile storage device comprising: a mobile frame unit, a storage compartment mounted on the frame unit and having one end thereof hingedly fixed with respect to the frame unit to permit tilting of the storage compartment adjacent one end thereof away from the frame unit, means for tilting the storage compartment, an adjustable opening in said storage compartment adjacent the hinged end of the compartment, means for mechanically moving material from the storage compartment to the exterior thereof including an auger mechanism having a split casing and having one portion of the split casing hingedly mounted on the fixed portion of the storage compartment and the other split casing portion hingedly mounted on a movable portion of the storage compartment whereby the adjustable opening in the storage compartment corresponds with the opening provided by the split casing, and a prime mover for operating the auger to permit emptying the storage compartment.

4. A mobile storage device comprising: a mobile frame member, a storage bin hingedly mounted on the frame and having an opening therein adjacent to the hinged portion, a tubular conveyor mechanism removably mounted adjacent the storage device and having an opening therein to correspond with the opening in the storage bin, said tubular conveyor mechanism comprising a split casing construction which is adapted to be closed completely, an auger mechanism with the conveyor mechanism for feeding material from the storage bin through said opening to the exterior of the storage bin, said tubular conveyor mechanism adapted to be readily removed from the storage bin to permit mounting the same above an open end of the storage bin to permit filling the storage bin through the reverse feeding through the tubular conveyor mechanism, there being provided in the tubular wall of the conveyor mechanism an adjustable door adapted to be opened to permit material to be so fed into the storage bin during such loading operation.

5. A storage device comprising: a frame portion, a storage compartment mounted on the frame portion and having one end thereof pivotally mounted with respect to said frame to permit tilting the storage compartment, means for tilting the storage compartment, an adjustable door in said storage compartment adjacent the pivotal end of the compartment, means for mechanically moving material from the storage compartment to the exterior thereof including an auger mechanism having a split casing and having one portion of the split casing removably hingedly mounted on a fixed portion of the storage compartment and the other split casing portion removably hingedly mounted on the adjustable door whereby opening of said door provides for communication between said storage compartment and said auger mechanism, and a prime mover for operating said auger.

6. A storage device having one end adapted for emptying of its contents comprising: an adjustable door in said storage compartment adjacent said one end, means for mechanically moving material from the storage device to the exterior thereof including a conveyor mechanism having a semi-cylindrical portion hingedly mounted on a fixed portion of the storage device and the other cylindrical portion of said casing portion movably mounted on the adjustable door whereby opening of said door provides for communication between said storage compartment and said conveyor mechanism, said split casing providing a substantially dust free construction, to prevent loss of materials during operation, and a prime mover for operating said conveyor mechanism, said auger mechanism being adapted to automatically adjust its position with respect to said opening as the adjustable door is opened and shut.

References Cited in the file of this patent

UNITED STATES PATENTS

| | | |
|---|---|---|
| 1,075,779 | Gerber | Oct. 14, 1913 |
| 1,925,296 | Barrett | Sept. 5, 1933 |
| 2,393,849 | Werts | Jan. 29, 1946 |
| 2,471,280 | Norbom | May 24, 1949 |
| 2,595,395 | Lavelle et al. | May 6, 1952 |
| 2,751,097 | Miller | June 19, 1956 |

FOREIGN PATENTS

| | | |
|---|---|---|
| 1,080,785 | France | June 2, 1954 |